United States Patent [19]

Webb

[11] Patent Number: 4,642,901
[45] Date of Patent: Feb. 17, 1987

[54] PROPELLER CHECKING

[76] Inventor: Thomas A. Webb, 20 Prentice Street, Brunswick, Victoria 3056, Australia

[21] Appl. No.: 753,521

[22] Filed: Jul. 10, 1985

[51] Int. Cl.$^4$ ............................ G01B 5/24; G01B 7/30
[52] U.S. Cl. .................................................... 33/530
[58] Field of Search ................. 33/530, 551, 552, 557, 33/560, 175

[56] References Cited

U.S. PATENT DOCUMENTS

| 1,736,247 | 11/1929 | Bodenlos | 33/560 X |
| 2,445,324 | 7/1948 | Greenwell | 33/175 |
| 2,568,817 | 9/1951 | Moss | 33/530 X |
| 3,264,743 | 8/1966 | Bell | 33/560 |
| 4,411,073 | 10/1983 | Ryan | 33/530 |

FOREIGN PATENT DOCUMENTS

| 2917051 | 11/1980 | Fed. Rep. of Germany | 33/175 |
| 94346 | 7/1959 | Norway | 33/530 |

Primary Examiner—Harry N. Haroian
Attorney, Agent, or Firm—Andrus, Sceales, Starke & Sawall

[57] ABSTRACT

A propeller checking device comprising a mounting means adapted to be mounted on an axis coincident with or parallel to the axis of a propeller to be checked and which has a plurality of pins mounted on mountable to the plate to be movable with respect thereto to contact, in use, a propeller to thereby give a representation of a parameter of the propeller.

7 Claims, 7 Drawing Figures

PROPELLER CHECKING

This invention relates to propeller testing and to a device for checking a propeller.

It is sometimes necessary to check propellers as to their actual diameter, pitch, pitch angle and style and the present invention provides a checking device for checking at least one of those parameters.

The present invention provides a propeller checking device comprising a mounting means adapted to be mounted on an axis coincident with or parallel to the axis of a propeller to be checked and which has a plurality of pins mounted or mountable to the plate to be movable with respect thereto to contact, in use, a propeller to thereby give a representation of a parameter of the propeller.

Preferably one of the pins is operative on a measuring device to give a reference to a datum.

Preferably at least some of said pins are mounted chordally to the first mentioned axis whereby to give, in use, a representation of at least one of the pitch, pitch angle or pitch style of the propeller.

Preferably at least some of said pins are mounted radially to the first mentioned axis whereby to give, in use, a representation of one or more radius of the propeller.

Preferably said mounting means includes a surface perpendicular to the first mentioned axis. Thus distance of projection of one or other ends of said pins from said surface may be measured. Such measurement may be put to a number of uses. For instance, two pins mounted chordally as aforesaid and together making a known angle of x with said axis can give pitch by multiplying (360 divided by x) by the difference in distance of projection of the two pins from said surface. The angle x is preferably such that (360 divided by x) is a whole number. The mounting means may be such as to provide a selection of values of x. Such measurement may be facilitated by the use of pins having length graduations thereon or by the use, in lieu or addition, of a measuring device such as a dial indicator or a micrometer which may be calibrated to directly read pitch or a multiple or dividend thereof.

The device may include a base having a post onto which a propeller and said mounting means may be received and which will define the first mentioned axis. Spring load is preferably applied to said mounting means to urge it towards the propeller. The base may have means for centering a propeller thereon.

Alternatively or additionally, the device may be provided with propeller in situ mounting means which may comprise means for attachment to a propeller shaft having a propeller and a mount for said mounting means which extends parallel to the propeller shaft.

Means may be provided to prevent, when desired, rotation of the propeller or said mounting means about the first mentioned axis.

Said mounting means is preferably a plate having holes for mounting it to the first mentioned axis and for receiving said pins, a datum pin and a dial gauge.

Said pins are preferably mounted to the mounting means via collets.

In a preferred form the present invention provides a propeller checking device comprising a plate having a planar surface, means for mounting the plate such that said surface lies perpendicular to the axis of a propeller to be checked and wherein the plate has a first set of holes lying along a line which, in use, will be radial to said axis and adapted to receive pins which, when in contact with a blade of the propeller will give a representation of a radius of the propeller.

a second set of holes lying along a line which, in use, will be chordal to said axis and adapted to receive pins which, when in contact with a blade of the propeller will give a representation of at least one of the pitch, pitch angle or pitch style of the propeller.

There may be a third set of holes arcuate, in use, to said first mentioned axis.

A specific construction of a propeller checking device will now be described with the aid of the accompanying drawings in which.

Figure 1:
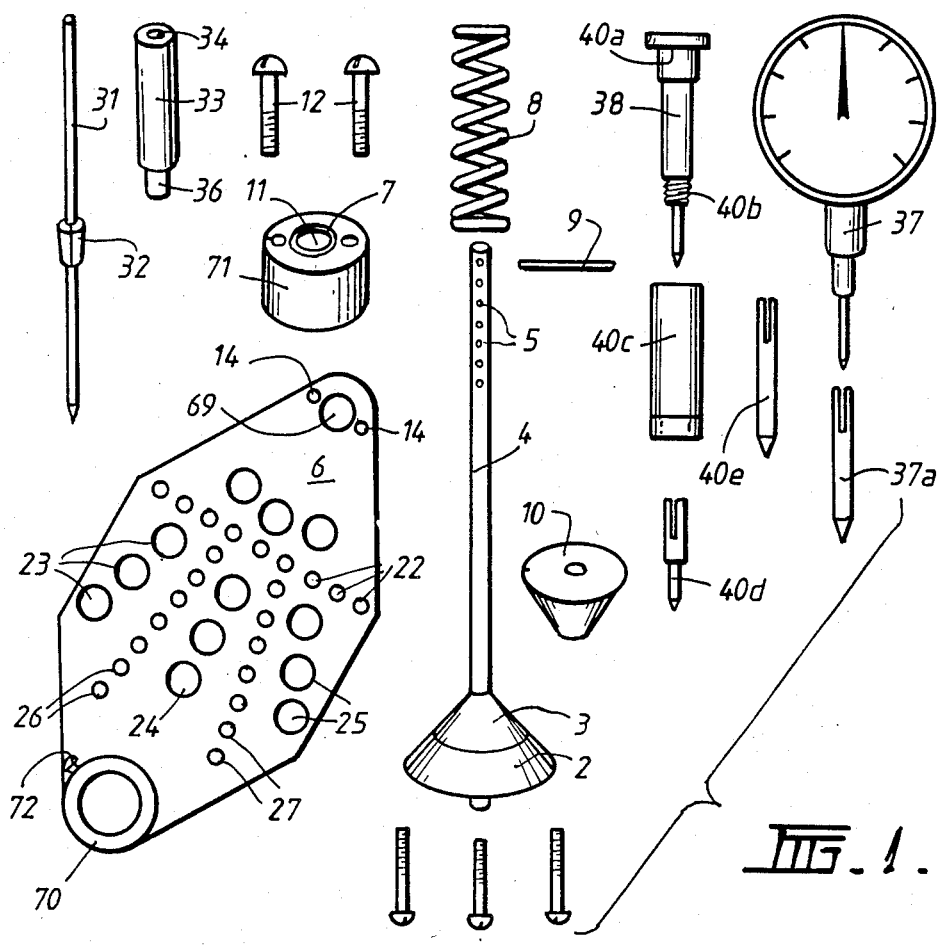
FIG. 1 is an exploded view partly in perspective and partly in plan of the device.
Figure 1:
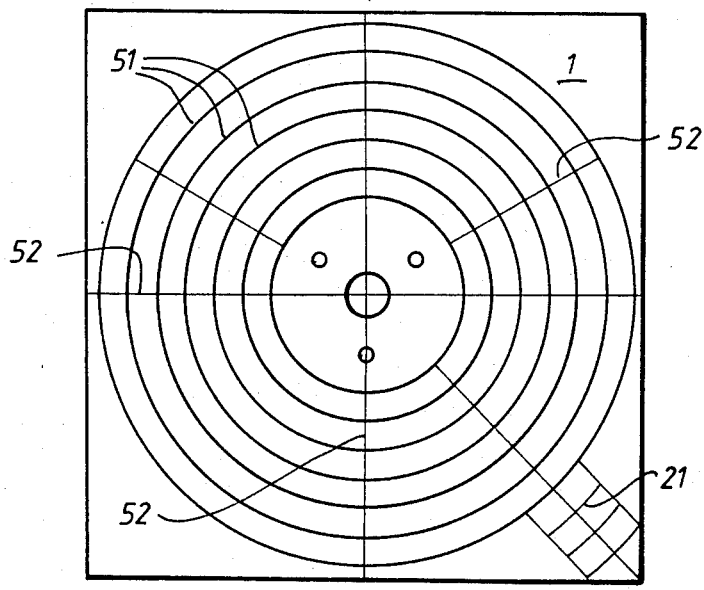

The device shown in FIGS. 1-6 of the drawings comprises a base 1, a central boss 2 having a propeller centering conic upper surface 3, a circular post 4 having holes 5 therein, a propeller centering conic body 10 slidable on the post 4, a plate 6 which has a bushing 7 with a hole 11 enabling it to slide up and down and rotate on the post 4, a spring 8 for locating on the post 4 above the plate 6 for urging the plate 6 downwardly and a pin 9 which can be located in a selected one of the holes 5 to provide the desired tension in the spring 8.

The bushing 7 is carried in a boss 71 which is secured by screws 12 which pass into holes 14 in the plate 6.

The base 1 has a diameter scale 21 thereon and also concentric lines 51 and radial lines 52 all of which will be found to be useful in propeller checking.

Figure 2:
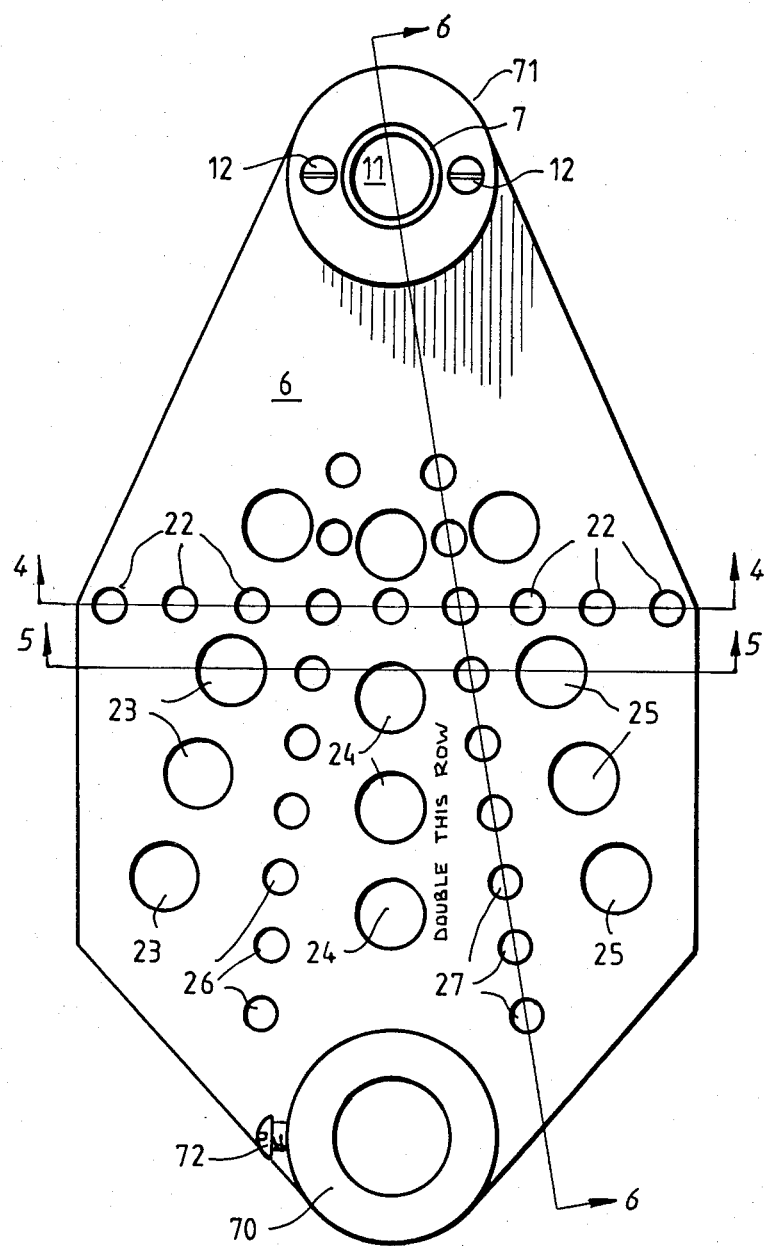
FIG. 2 is a plan view of part of the device.

The plate 6 has a series of holes 22 which lie on line 4—4 in FIG. 2 and which are perpendicular (chordal) to a perpendicular to the axis defined by post 4 and hole 11. The holes 22 are desirably equidistantly spaced.

The plate 6 has three rows of holes 23, 24 and 25 which lie on an arc about hole 11 and are desirably equidistantly spaced from hole 11. The rows of holes 23 and 25 make a predetermined angle x with the hole 11 and, in use, post 4 and hence the angle of the rows of holes 23 and 24 or 24 and 25 with the hole 11 and, in use, post 4 is x/2. The value of x is chosen, as a matter of convenience such that (360 divided by x) is a whole number. In the present instance x is 36° but x might conveniently be one of 18°, 30°, 45°and 60°. The holes in row 24 having a marking "Double this Row" therebeside.

The plate 6 has rows of holes 26 and 27 which lie on lines radial to hole 11 and, in use, post 4 (one of which series lying on line 6—6 in FIG. 2). The series of holes 26 and 27 conveniently are at an angle of x divided by 4 to one another but this is not essential. The holes in each of the rows 26 and 27 are desirably equidistantly spaced.

The device also comprises a plurality of pins 31, split collets 32 therefor (so that the pins 31 may be received in the holes 22, 26 and 27) and a collet hammer 33 which is useful for setting and removing the collets. The collet hammer 33 has a through bore 34 adapted to receive the pins 31 and a nose portion 36 which is adapted to enter the holes 22, 26 and 27.

Figure 5:
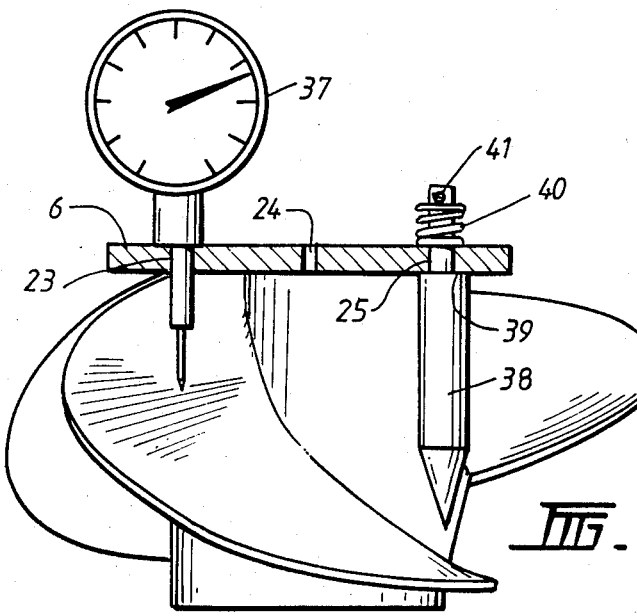
FIG. 5 is a cross-section on line 5—5 in FIG. 2 and shows use of the device to measure pitch of a propeller.

The device further comprises a dial indicator 37 and a datum pin 38. The datum pin 38 and dial indicator 37 are receivable in selected ones of holes 23, 24 and 25. A preferred datum pin is shown in FIG. 1 and an alternative is shown in FIG. 5. The datum pin shown in FIG. 1 is receivable into a selected one of the holes 23, 24 and 25 so that the surface 40a will abut with the plate 6. Further, it has a screw thread 40b for receiving a hollow nut 40c and can receive an extension 40d or 40e or both.

An extension 37a for the dial indicator 37 is also provided.

The datum pin shown in FIG. 5 has an abutment 39, which in use can fit against the underside of the plate 6, a spring 40, and a removable pin 41 by means of which the datum pin 38 may be secured to the plate 6.

The above described device will be found useful in checking propellers of boats but may also be used in respect of aircraft propellers, fans such as air-conditioning fans and impellers as water pump impellers and jet boat impellers and might be used for measuring wedges and tapers, if suitably modified or used.

The device may be used for checking a number of parameters of a propeller including diameter, blade rake, pitch, pitch angle and pitch profile.

Illustrative uses of the device are given below.

Figure 3:
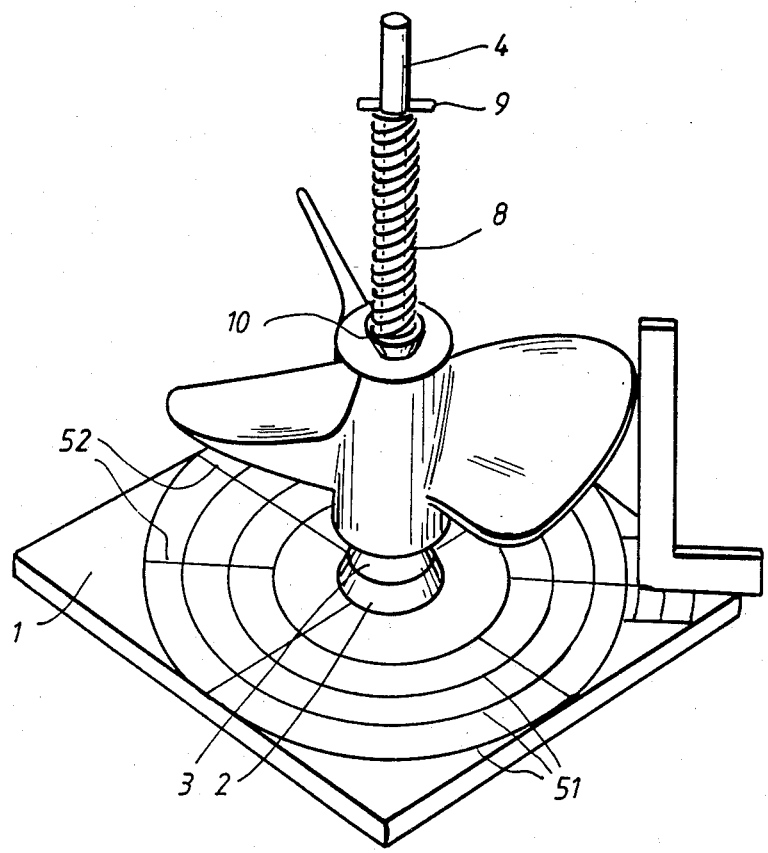
FIG. 3 is a perspective view showing use of the device to measure the diameter of a propeller.

Reference is made to FIG. 3 which shows the use of a square at the tip of a propeller and extending vertically from the diameter scale 21 will enable the diameter of a propeller to be read.

Figure 4:
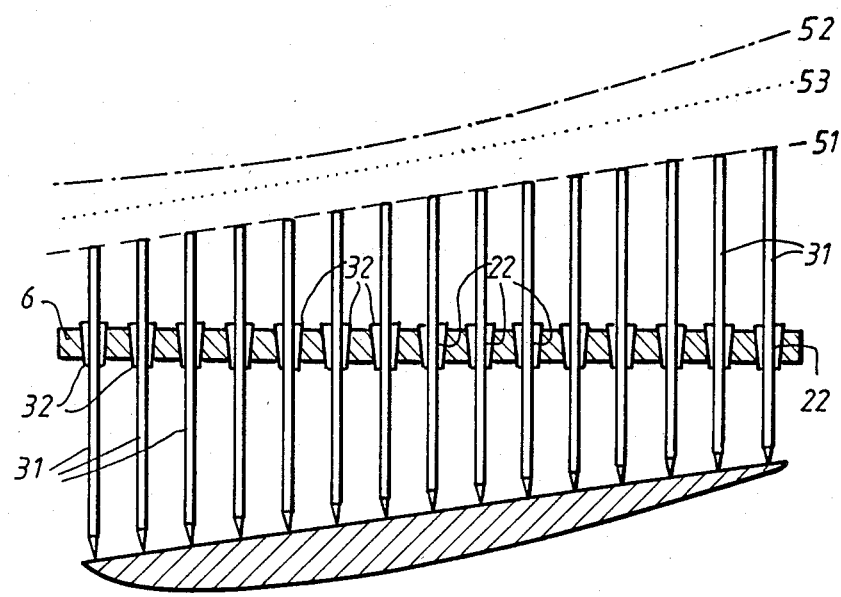
FIG. 4 is a cross-section on line 4—4 in FIG. 2 and shows the use of the device to represent pitch of a propeller.

Reference is made to FIG. 4 which shows the use of the pins 31 in the holes 22 to indicate pitch profile. In this instance the pins 31 in the holes 22 are pushed down to contact the propeller and as they are the same length their upper ends will represent the pitch profile. As shown in dash line 51 the propeller in question has a true pitch. Alternative forms of propeller might have two different pitches at the leading and trailing end as indicated by dot-dash line 52 or progressive pitch as shown by dot line 53. Pitch can be measured by measuring the height difference of two of the pins in the holes 22 and multiplying that difference by 360 divided by y where y is the angle the two pins in question make with the hole 11 and the post 4.

Reference is made to FIG. 5 which shows the datum pin 38 and the dial indicator 37 in contact with the propeller. The dial indicator 37 is calibrated to directly read pitch when located in holes 23 or 25 and to show half of pitch when located in hole 24 (i.e. the value shown is doubled to get pitch). It may be necessary to hold the propeller and/or the plate 6 still while measuring pitch and means may be provided for doing this.

Pitch and pitch profile may be measured on the leading and trailing faces of each blade of the propeller to ascertain the degree or uniformity, and particular characteristics of each of the blades.

Figure 6:
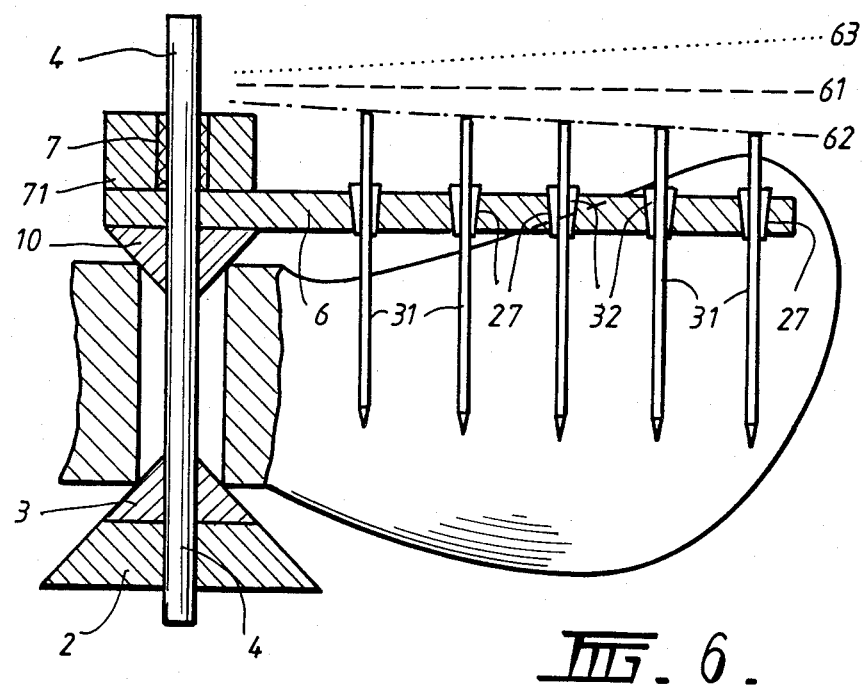
FIG. 6 is a cross-section on line 6—6 in FIG. 2 and shows use of the device to determine propeller rake.

Reference is made to FIG. 6 which shows the pins 31 in one of the series of holes 26 and 27. As in determining pitch profile, the pins 31 are pushed into contact with the propeller and the contour of their upper ends will show rake. A dash line 61 indicates a square propeller, a dot-dash line 62 indicates forward rake and a dot line 63 indicates an aft rake propeller.

Similar rake tests may be made on other blades and in other regions of the blades.

Static balance of a propeller may also be tested by positioning the post 4 to be horizontal and seeing whether gravity regularly causes a part of the propeller to be at the bottom. Lathe centres may desirably be used to hold the post 4 in this horizontal orientation.

The plate 6, without the base 1 and post 4, may be mounted directly to a propeller shaft for in situ measurements and for this purpose the bushing 7 is retained in the boss 71 which may be made removable and replaced by another boss having a through hole of a size to suit a paticular propeller shaft. Alternatively the plate 6 may have a hole 69 below the boss 71 large enough to accommodate a range of propeller shafts and in this instance it may be desirable to use spacer rings to obtain centering of the plate 6 on the propeller shaft.

Figure 7:
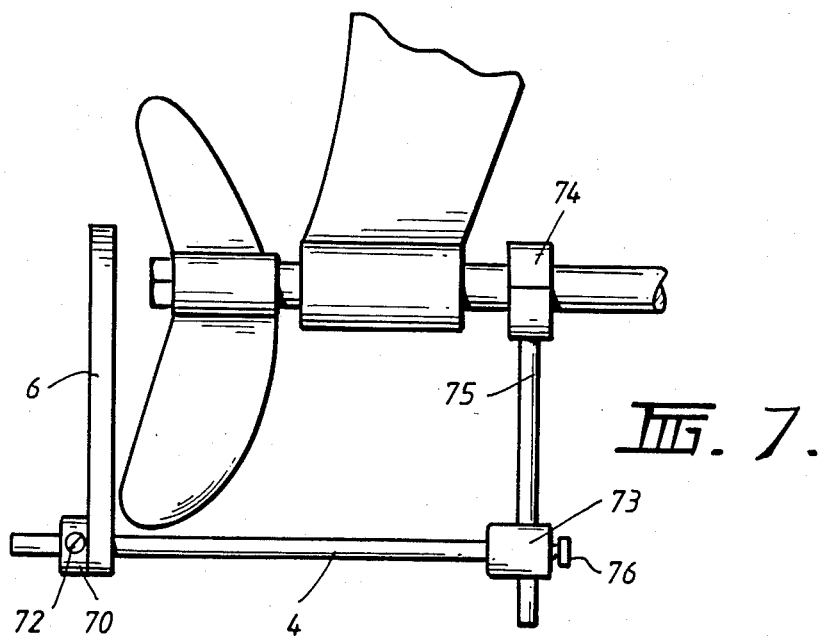
FIG. 7 is a side elevational view of a modified version of the device for mounting to a propeller shaft for purposes of in situ checking of a propeller.

The modified version shown in FIG. 7 has a boss 70 and a setscrew 72 to enable the plate 6 to be fixed to the post 4. The post 4 is provided with an end fitting 73 in which an arm 75 is slidably received. The arm 75 has v-blocks 74 which enable it to be clamped to a propeller shaft and the distance of the post 4 from the propeller shaft can be set by using the setscrew 76. In this instance the boss 70 is not co-axial with the propellor but is parallel thereto and is placed at a known distance from that axis; preferably such that the hole 11 is co-axial with the propeller shaft. With the plate 6 so mounted similar measurements may be take as described above without the need to demount the propeller from the propeller shaft.

Since it is generally desirable that propeller pitch is measured at about ⅔rds diameter, the plate may be provided with holes equivalent to 23, 24 and 25 but of various radii to hole 11 or alternatively the plate 6 may be made in a number of sizes with appropriately positioned holes 23, 24 and 25.

The claims form part of the disclosure of this specification.

Modifications and adaptations may be made to the above described without departing from the spirit and scope of this invention which includes every novel feature and combination of features disclosed herein.

The claims defining the invention are as follows:

1. A propeller checking device comprising:
   a mounting means adapted to be mounted so as to intersect the axis of the propeller;
   a datum pin mountable to said mounting means at a first position for contacting the propeller; and
   a dial indicator mountable to said mounting means at a second position and having a sensing pin for contacting the propeller, said second position and said first position being radially equidistant from the propeller axis and being arcuately spaced apart to subtend a predetermined angle about the propeller axis, said dial indicator being so calibrated that, when the datum pin and sensing pin are in contact with said propeller, the dial indicator will give a direct reading of one of the pitch of the propeller, a multiple thereof, and a fraction thereof.

2. A propeller checker as claimed in claim 1 wherein the location of said first mounting position and said second mounting position, and the calibration of said dial indicator are such as to give a direct reading of the pitch of the propeller, and wherein a selected one of the datum pin and dial indicator is mountable to the mounting means at a third position arcuately intermediate said first and second positions such that when said datum pin and sensing pin are so mounted and are in contact with said propeller, the dial indicator will give a reading of half the pitch of the propeller.

3. A propeller checker as claimed in claim 1 wherein the mounting means includes a member having a surface extending normal to the propeller axis and on which said datum pin and dial indicator are mounted at said first and second positions.

4. A propeller checker as claimed in claim 3 wherein said first position and second position are defined by holes in said surface of said member adapted to receive said datum pin and dial indicator.

5. A propeller checker as claimed in claim 1 including a base having a post onto which a propeller and said mounting means may be received.

6. A propeller checking device comprising:
   a plate;
   a mounting means coupled to said plate for positioning said plate with respect to a propeller such that said plate intersects the axis of the propeller;
   a datum pin mounted in a first hole in said plate for contacting the propeller; and
   a dial indicator mountable in a second hole in said plate and having a sensing pin for contacting the propeller, said first hole and said second hole being radially equidistant from the axis of the propeller and arcuately spaced apart to subtend a predetermined angle about the axis of the propeller, said dial indicator being so calibrated that when said datum pin and sensing pin are in contact with the propeller, the dial indicator will give a direct reading of one of the pitch of the propeller, a multiple thereof, and a fraction thereof.

7. A propeller checking device as claimed in claim 6 for checking a propeller on a shaft and including a shaft mount comprising a first means adapted to be mounted to the shaft of the propeller, and second means adapted to adjust the position of said mounting means with respect to the shaft so that said plates intersects the axis of the propeller.

* * * * *